(12) United States Patent
Zhang et al.

(10) Patent No.: US 10,981,824 B2
(45) Date of Patent: Apr. 20, 2021

(54) HIGHLY TEMPERATURE-RESISTANT GLASS FIBER AND PREPARATION METHOD THEREFOR

(71) Applicant: CHONGQING POLYCOMP INTERNATIONAL CORPORATION, Chongqing (CN)

(72) Inventors: Cong Zhang, Chongqing (CN); Hongbin Li, Chongqing (CN); Bo Yu, Chongqing (CN); Yuan Yao, Chongqing (CN); Bin Zhou, Chongqing (CN); Guoyun Yang, Chongqing (CN); Baijiang Gong, Chongqing (CN); Shaorong Ban, Chongqing (CN); Lixiong Han, Chongqing (CN)

(73) Assignee: CHONGQING POLYCOMP INTERNATIONAL CORPORATION, Chongqing (CN)

( * ) Notice: Subject to any disclaimer, the term of this patent is extended or adjusted under 35 U.S.C. 154(b) by 113 days.

(21) Appl. No.: 16/322,940

(22) PCT Filed: Mar. 30, 2018

(86) PCT No.: PCT/CN2018/081325
§ 371 (c)(1),
(2) Date: Feb. 2, 2019

(87) PCT Pub. No.: WO2018/233342
PCT Pub. Date: Dec. 27, 2018

(65) Prior Publication Data
US 2019/0185372 A1    Jun. 20, 2019

(30) Foreign Application Priority Data

Jun. 19, 2017  (CN) .......................... 201710463953.5

(51) Int. Cl.
*C03C 13/00* (2006.01)
*C03B 37/02* (2006.01)
*C03C 3/087* (2006.01)

(52) U.S. Cl.
CPC .......... *C03C 13/00* (2013.01); *C03B 37/0203* (2013.01); *C03B 37/0206* (2013.01); *C03C 3/087* (2013.01); *C03C 2213/00* (2013.01)

(58) Field of Classification Search
CPC ......... C03C 13/00; C03C 13/06; C03C 3/087; C03B 37/0206; C03B 37/0203
See application file for complete search history.

(56) References Cited

U.S. PATENT DOCUMENTS

| | | | |
|---|---|---|---|
| 6,809,050 B1 * | 10/2004 | McGinnis | ............... C03C 13/00 501/35 |
| 9,096,459 B2 | 8/2015 | Koyama et al. | |
| 2007/0209401 A1 | 9/2007 | Berthereau et al. | |
| 2011/0236684 A1 | 9/2011 | Teschner et al. | |
| 2012/0135849 A1 | 5/2012 | Hoffman et al. | |
| 2015/0018194 A1 | 1/2015 | Li et al. | |
| 2019/0077699 A1 | 3/2019 | Zhang et al. | |

FOREIGN PATENT DOCUMENTS

| | | | |
|---|---|---|---|
| CN | 1392870 A | 1/2003 | |
| CN | 1934044 A | 3/2007 | |
| CN | 101815685 A | 8/2010 | |
| CN | 102482142 A | 5/2012 | |
| CN | 103396001 A | 11/2013 | |
| CN | 105392744 A | 3/2016 | |
| CN | 105819698 A | 8/2016 | |
| CN | 107417128 A | 12/2017 | |
| EP | 1332118 B1 | 8/2003 | |
| GB | 1531287 A | 11/1978 | |
| JP | S63176332 A | 7/1988 | |
| WO | 9901393 A1 | 1/1999 | |
| WO | WO-9901393 A1 * | 1/1999 | ............. C03C 13/00 |
| WO | 0220419 A1 | 3/2002 | |
| WO | 0242233 A2 | 5/2002 | |

OTHER PUBLICATIONS

International Search Report for PCT/CN2018/081325 dated Jun. 15, 2018, ISA/CN.
First Office Action dated Aug. 21, 2019 for Chinese patent application No. 201710463953.5, 8 pages, English translation provided by Global Dossier.
First Office Action dated Nov. 12, 2019 for Japanese patent application No. 2019-500565, 3 pages, English translation provided by Global Dossier.

* cited by examiner

*Primary Examiner* — Elizabeth A. Bolden
(74) *Attorney, Agent, or Firm* — Yue (Robert) Xu; Apex Attorneys at Law, LLP

(57) ABSTRACT

A highly temperature-resistant glass fiber and a preparation method therefor. The glass fiber comprises 62-66 wt % of $SiO_2$, 14-19 wt % of $Al_2O_3$, 15-20 wt % of CaO, 0-2 wt % of MgO, 0-3 wt % of $Fe_2O_3$, and 0-1.2 wt % of $TiO_2$, the total content of $Na_2O$ and $K_2O$ is 0.1-0.8 wt %. By precisely controlling the mixture of the components, the glass fiber has good resistance to high temperature and formability, and significantly increases the high-temperature softening point. The glass fiber has a forming temperature of not exceeding 1380° C., an upper limit temperature of devitrification of lower than 1280° C., and a high temperature softening temperature of 950° C. or above.

2 Claims, No Drawings

HIGHLY TEMPERATURE-RESISTANT GLASS FIBER AND PREPARATION METHOD THEREFOR

The present application is a National Phase entry of PCT Application No. PCT/CN2018/081325, titled "HIGHLY TEMPERATURE-RESISTANT GLASS FIBER AND PREPARATION METHOD THEREFOR", filed Mar. 30, 2018, which claims priority to Chinese Patent Application No. 201710463953.5, titled "HIGHLY TEMPERATURE-RESISTANT GLASS FIBER AND PREPARATION METHOD THEREFOR", filed on Jun. 19, 2017 with Chinese Patent Office, the entire contents of which are incorporated herein by reference.

FIELD

The present invention belongs to the technical field of non-metal materials, and especially relates to a high temperature resistant glass fiber and a preparation method thereof.

BACKGROUND

Glass fiber is an inorganic non-metallic material with excellent performance, which has many advantages such as high specific strength, high specific modulus, good electrical insulation, high heat resistance and good corrosion resistance, etc., is currently the most widely used reinforcing substrate in the resin-based composite materials, and the use ratio thereof exceeds 90%.

The main components of glass fiber are silica, alumina, calcium oxide, boron oxide, magnesium oxide, sodium oxide, etc., which can be divided into alkali-free glass fiber (sodium oxide 0%-2%, belonging to aluminoborosilicate glass), medium alkali glass fiber (sodium oxide 8%-12%, belonging to soda-calcium silicate glass containing or not containing boron) and high alkali glass fiber (sodium oxide 13% above, belonging to soda lime silicate glass) according to the alkali content in the glass, wherein the most widely used of which is alkali-free glass fiber, also known as E-glass fiber.

With the continuous development of the application field of glass fiber composite materials, the performance requirements of E-glass fiber in the industry are also constantly increasing, especially in the fields of aerospace, military, automobile, etc., and they have stricter requirements on the high temperature resistance and molding performance of the materials, but existing E-glass fiber generally has problems of low softening temperature and excessive high molding temperature.

SUMMARY

In this regard, an object of the present invention is to provide a high temperature resistant glass fiber and a preparation method thereof, and the high temperature resistant glass fiber provided by the present invention has a high softening temperature and a good molding performance.

The present invention provides a high temperature resistant glass fiber comprising the following components:

| | |
|---|---|
| $SiO_2$ | 62-66 wt %; |
| $Al_2O_3$ | 14-19 wt %; |
| CaO | 15-20 wt %; |
| MgO | 0-2 wt %; |
| $Fe_2O_3$ | 0-3 wt %; |
| $TiO_2$ | 0-1.2 wt %; |
| the total content of $Na_2O$ and $K_2O$ | 0.1-0.8 wt %. |

Preferably, it comprises 63-65 wt % of $SiO_2$.
Preferably, it comprises 16-18 wt % of $Al_2O_3$.
Preferably, it comprises 16-19 wt % of CaO.
Preferably, it comprises 0-1 wt % of MgO.
Preferably, it comprises 0.1-2 wt % of $Fe_2O_3$.
Preferably, it comprises 0.1-0.8 wt % of $TiO_2$.
Preferably, the total content of the $Na_2O$ and $K_2O$ is 0.1-0.4 wt %.
Preferably, it also comprises $ZrO_2$ and/or BaO in a total amount of not more than 2 wt %.

The present invention provides a method for preparing the high temperature resistant glass fiber according to the above technical solution, comprising the steps of:

a) selecting glass raw materials according to the components of the high temperature resistant glass fiber, and calculating the amount of each of the raw materials used;

b) mixing each of the raw materials and then melting to obtain a glass liquid; and c) drawing the glass liquid into a glass filament by a wire drawing machine and then cooling to obtain the high temperature resistant glass fiber.

Compared with the prior art, the present invention provides a high temperature resistant glass fiber and a preparation method thereof. The high temperature resistant glass fiber provided by the present invention comprises $SiO_2$ 62-66 wt %; $Al_2O_3$ 14-19 wt %; CaO 15-20 wt %; MgO 0-2 wt %; $Fe_2O_3$ 0-3 wt %; $TiO_2$ 0-1.2 wt %; the total content of $Na_2O$ and $K_2O$ 0.1-0.8 wt %. The present invention ensures that the glass fiber has a good high temperature resistance and molding property by precisely controlling the proportion of each component, in particular the high temperature softening point of the glass is significantly improved; in the glass fiber formulation of the present invention, $ZrO_2$ and/or BaO may be added in a total amount of not more than 2 wt % as needed, and the introduction of these elements contributes to further improving the high temperature resistance of the glass fiber. The experimental results show that the molding temperature of the glass fiber of the present invention does not exceed 1380° C., the upper limit temperature of crystallization is lower than 1280° C., and the high temperature softening temperature of the glass fiber is above 950° C.

DETAILED DESCRIPTION OF THE EMBODIMENTS

The technical solutions in the examples of the present invention are clearly and completely described below. It is obvious that the described examples are only a part of the examples of the present invention, and not all of the examples. Based on the examples of the present invention, all other examples obtained by those skilled in the art without creative efforts are within the scope of the present invention.

The present invention provides a high temperature resistant glass fiber comprising the following components:

| | |
|---|---|
| $SiO_2$ | 62-66 wt %; |
| $Al_2O_3$ | 14-19 wt %; |

-continued

| | |
|---|---|
| CaO | 15-20 wt %; |
| Fe₂O₃ | 0.1-3 wt %; |
| MgO | 0-2 wt %; |
| TiO₂ | 0-1.2 wt %; |
| the total content of Na₂O and K₂O | 0.1-0.8 wt %. |

The high temperature resistant glass fiber provided by the present invention includes $SiO_2$, $Al_2O_3$, CaO, $Fe_2O_3$, MgO, $TiO_2$, $Na_2O$ and $K_2O$. Among them, silica ($SiO_2$) is one of the main oxides forming a glass network, and it mainly serves to improve the mechanical properties, chemical stability and thermal stability of the glass. The content of $SiO_2$ of the present invention is 62-66 wt %, preferably 63 wt %-65 wt %, specifically 62 wt %, 63 wt %, 64 wt %, 65 wt % or 66 wt %.

In the present invention, Alumina ($Al_2O_3$) is also one of the main oxides forming a glass network, which has the effect of reducing the crystallization tendency of the glass and improving the structure of the glass network. The content of $Al_2O_3$ of the present invention is 14-19 wt %, preferably 16-18 wt %, specifically 14.7 wt %, 16 wt %, 16.7 wt %, 17.8 wt % or 18.5 wt %.

In the present invention, both calcium oxide (CaO) and magnesium oxide (MgO) belong to the outer oxide of the glass structure network, which has the effect of lowering the high temperature viscosity of the glass and improving the glass frit. At the same time, the proper content and proportion also contribute to improving the stability of the glass network structure. The content of CaO of the present invention is 15-20 wt %, preferably 16-19 wt %, specifically 15 wt %, 16.3 wt %, 17.5 wt %, 18 wt % or 19.1 wt %; the content of MgO is 0-2 wt %, preferably the content of MgO is 0-1 wt %, specifically 0.3 wt % or 1 wt %.

In the present invention, Iron oxide ($Fe_2O_3$) is beneficial to the heat transfer in the tank furnace, has heat resistance and creep resistance in the glass fiber, and the improvement of the iron oxide ratio can effectively increase the high temperature softening temperature of the glass. The content of iron oxide of the present invention is 0-3 wt %, preferably 0.1-2 wt %, specifically 0.5 wt %, 0.9 wt %, 1.5 wt % or 2.3 wt %.

In the present invention, the addition of titanium dioxide ($TiO_2$) helps to improve the high temperature fluidity and crystallization tendency of the glass, and improves the tensile modulus and corrosion resistance of the glass fiber. In the present invention, the content of $TiO_2$ is 0-1.2 wt %, preferably 0.1-0.8 wt %, specifically 0.1 wt %, 0.2 wt % or 0.4 wt %.

In the present invention, $Na_2O$ and $K_2O$ are added to the glass composition of the present invention, which contribute to lowering the viscosity of the glass and improving the crystallization tendency of the glass. In the present invention, the content of $Na_2O+K_2O$ is 0.1-0.8 wt %, preferably 0.1-0.4 wt %, specifically 0.3 wt %, 0.4 wt % or 0.5 wt %.

According to the present invention, as a preferred embodiment, the glass fiber composition of the present invention may further comprises $ZrO_2$ and/or BaO in a total amount of not more than 2 wt % without affecting the molding performance of the glass fiber, and their addition can further improve the high temperature softening temperature of the glass fiber. In an example provided by the present invention, the content of $ZrO_2$ is preferably 0.05-1.5 wt %, specifically 0.1 wt % or 0.6 wt %; the content of BaO is preferably 0.05-1.5 wt %, specifically 0.1 wt % or 0.2 wt %.

The present invention provides a method for preparing the high temperature resistant glass fiber according to the above technical solution, comprising the steps of:

a) selecting glass raw materials according to the components of the high temperature resistant glass fiber, and calculating the amount of each of the raw materials used;

b) mixing each of the raw materials and then melting to obtain a glass liquid; and c) drawing the glass liquid into a glass filament by a wire drawing machine and then cooling to obtain the high temperature resistant glass fiber.

In the preparation method provided by the present invention, firstly, glass raw materials are selected according to the components of the high temperature resistant glass fiber, and the amount of each raw material is calculated, and then each of the raw materials is mixed and then melted to obtain a glass liquid. Wherein the melting temperature is preferably 1400-1500° C.; the melting device is preferably a tank furnace. The present invention preferably clarifies and homogenizes the molten glass solution.

After the glass liquid is obtained, the glass liquid is drawn into a glass filament by a wire drawing machine and then cooled to obtain a high temperature resistant glass fiber. Wherein, the cooling method is preferably spray cooling; the diameter of the glass fiber is preferably 5 to 25 μm. In the present invention, the glass liquid is preferably cooled prior to being drawn by a wire drawing machine, and preferably to a temperature of 1300 to 1380° C. After obtaining the glass fiber, it is preferred to apply a sizing agent to the surface thereof.

The present invention ensures that the glass fiber has a good high temperature resistance and molding property by precisely controlling the proportion of each component, in particular the high temperature softening point of the glass is significantly improved; in the glass fiber formulation of the present invention, $ZrO_2$ and/or BaO may be added in a total amount of not more than 2 wt % as needed, and the introduction of these elements contributes to further improving the high temperature resistance of the glass fiber. The experimental results show that the molding temperature of the glass fiber of the present invention does not exceed 1380° C., the upper limit temperature of crystallization is lower than 1280° C., and the high temperature softening temperature of the glass fiber is above 950° C.

In order to further understand the present invention, the glass fiber provided by the present invention will be described in detail below with reference to the examples, and the scope of the present invention is not limited by the following examples.

Examples 1-5

The glass raw materials were selected according to the glass fiber composition shown in Table 1, and the amount of each of the raw materials was calculated:

TABLE 1

Example Glass Fiber Formulation Table

| Composition | Example 1 | Example 2 | Example 3 | Example 4 | Example 5 |
|---|---|---|---|---|---|
| SiO₂ | 62 | 63 | 64 | 65 | 66 |
| Al₂O₃ | 18.5 | 17.8 | 16.7 | 14.7 | 16 |
| CaO | 19.1 | 18 | 17.5 | 16.3 | 15 |
| Fe₂O₃ | — | 0.5 | 0.9 | 1.5 | 2.3 |
| MgO | — | — | 0.3 | 1 | 0.3 |
| TiO₂ | — | 0.2 | 0.1 | 0.4 | 0.1 |

TABLE 1-continued

Example Glass Fiber Formulation Table

| Composition | Example 1 | Example 2 | Example 3 | Example 4 | Example 5 |
|---|---|---|---|---|---|
| $Na_2O + K_2O$ | 0.4 | 0.5 | 0.3 | 0.3 | 0.3 |
| $ZrO_2$ | — | — | 0.1 | 0.6 | — |
| BaO | — | — | 0.1 | 0.2 | — | then the required raw materials were weighed in proportion, all were transported to the mixing tank, and after mixing evenly, the mixed materials were transported to the stock bin of the tank furnace;

the mixed materials in the stock bin of the tank furnace were put into the tank furnace, in the tank furnace, the mixed materials were gradually melted into a glass liquid at a high temperature of 1400° C. or higher, and after clarification and homogenization, the stable and high quality glass liquid enters the drawing operation channel;

after cooling the glass liquid in the drawing operation channel to a suitable temperature, it flows out through the platinum leakage plate, and is quickly drawn by a wire drawing machine into a glass filament having a diameter of 3 to 25 pin;

the glass filament was spray-cooled and coated with an sizing agent to obtain a glass fiber.

Comparative Example 1

The glass raw materials were selected according to the glass fiber composition shown in Table 2, and the amount of each of the raw materials was calculated:

TABLE 2

Comparative Example Glass Fiber Formulation Table

| Composition | Comparative Example |
|---|---|
| $SiO_2$ | 65 |
| $Al_2O_3$ | 24 |
| CaO | ≤1 |
| $Fe_2O_3$ | 10 |
| MgO | — |
| $TiO_2$ | Trace |
| $Na_2O + K_2O$ | <0.5 |
| $ZrO_2$ | — |
| BaO | — | then the required raw materials were weighed in proportion, all were transported to the mixing tank, and after mixing evenly, the mixed materials were transported to the stock bin of the tank furnace;

the mixed materials in the stock bin of the tank furnace were put into the tank furnace, in the tank furnace, the mixed materials were gradually melted into a glass liquid at a high temperature of 1400° C. or higher, and after clarification and homogenization, the stable and high quality glass liquid enters the drawing operation channel;

after cooling the glass liquid in the drawing operation channel to a suitable temperature, it flows out through the platinum leakage plate, and is quickly drawn by a wire drawing machine into a glass filament having a diameter of 3 to 25 pin;

the glass filament was spray-cooled and coated with an sizing agent to obtain a glass fiber.

Example 6

The properties of the above glass fibers were tested, the results were shown in Table 3. Table 3 shows the formulation and properties of the glass fibers provided by the examples and comparative examples of the present invention. Wherein, $T_{log\ \eta}=3$ is the fiber molding temperature, which is detected by using BROOKFIELD high temperature viscometer; $T_{liquid}$ is the upper limit of glass crystallization temperature, which is determined by using Orton Model gradient furnace; $\Delta T$ is the difference between the fiber molding temperature and the upper limit of glass crystallization temperature; the glass softening temperature was measured by using Orton Model SP-1100 softening point detector; the heat resistance test method was as follows:

1) Weight Change Rate

The length of the test piece is 200 mm, and the number of samples is n=10.

Weight measurement conditions before heating: heating 100° C.×1 hr→drying→cooling in the furnace to normal temperature 1 hr→size, weight determination;

Weight measurement conditions after heating: 805° C.×4 hrs→heating→cooling in the furnace to normal temperature 1 hr→size, weight determination;

Comparing the difference in weight before and after heating, taking 10 samples to obtain an average value;

2) Heat Shrinkage Rate

The dimensional change before and after heating was compared under the same weight change rate.

3) Resistance to Tension

Experimental conditions: the heating conditions are the same as heating conditions of weight change rate, sample length is 200 mm, width is 150 mm; number of samples n=20;

the tensile strength of the sample before and after heating is tested respectively and averaged.

TABLE 3

Performance Data Table of Glass fiber provided in the Examples and Comparative Example

| Composition | Example 1 | Example 2 | Example 3 | Example 4 | Example 5 | Comparative Example |
|---|---|---|---|---|---|---|
| $T_{log\eta=3}$ (° C.) | 1319 | 1337 | 1352 | 1344 | 1368 | 1460 |
| $T_{liquid}$ (° C.) | 1202 | 1234 | 1228 | 1251 | 1280 | 1320 |
| $\Delta T$ (° C.) | 117 | 103 | 124 | 93 | 88 | 140 |
| High temperature softening temperature/° C. | 950 | 953 | 962 | 955 | 958 | 950 |
| Crystal phase transition temperature/° C. | 819 | 821 | 833 | 812 | 825 | 810 |

TABLE 3-continued

Performance Data Table of Glass fiber provided in the Examples and Comparative Example

| Composition | | Example 1 | Example 2 | Example 3 | Example 4 | Example 5 | Comparative Example |
|---|---|---|---|---|---|---|---|
| Heat resistance | Weight change rate/% | 0.77 | 0.75 | 0.74 | 0.73 | 0.74 |
| | Heat shrinkage rate/% | 0.28 | 0.34 | 0.3 | 0.32 | 0.38 |
| | Resistance to tension/(N/beam) | 45.1 | 54.8 | 60.1 | 58.3 | 57.8 |

As can be seen from Table 3, compared with the Comparative Example, the glass fiber provided by the examples of the present invention has a better high temperature resistance and a molding performance, the molding temperature does not exceed 1380° C., the upper limit temperature of crystallization is lower than 1280° C., and the high temperature softening temperature of the glass fiber is above 950° C.

The above description of the examples is only for helping to understand the method of the present invention and its core ideas. It should be noted that those skilled in the art can make various modifications and changes to the present invention without departing from the principle of the present invention. Such modifications and changes are also intended to fall within the scope of the appended claims. The above description of the disclosed examples will enable those skilled in the art to achieve or use the present invention, and various modifications of these examples will be apparent to those skilled in the art. The general principles defined herein may be implemented in other examples without departing from the spirit or scope of the present invention. Therefore, the present invention will not be limited to these examples shown herein, while conforms to the scope consistent with the principles and novel features disclosed herein.

The invention claimed is:

1. A high temperature resistant glass fiber comprising the following components:

| | |
|---|---|
| $SiO_2$ | 62-66 wt %; |
| $Al_2O_3$ | 14-19 wt %; |
| CaO | 15-20 wt %; |
| MgO | 0-2 wt %; |
| $Fe_2O_3$ | 0-3 wt %; |
| $TiO_2$ | 0-1.2 wt %; |
| the total content of $Na_2O$ and $K_2O$ | 0.1-0.8 wt %. | wherein the high temperature resistant glass fiber further comprises $ZrO_2$ and/or BaO in a total amount of not more than 2 wt %.

2. A method for preparing the high temperature resistant glass fiber according to claim 1, comprising the steps of:
a) selecting glass raw materials according to the components of the high temperature resistant glass fiber, and calculating the amount of each of the raw materials used;
b) mixing each of the raw materials and then melting to obtain a glass liquid; and
c) drawing the glass liquid into a glass filament by a wire drawing machine and then cooling to obtain the high temperature resistant glass fiber.

\* \* \* \* \*